US007648569B2

(12) United States Patent
Bras et al.

(10) Patent No.: US 7,648,569 B2
(45) Date of Patent: Jan. 19, 2010

(54) METHOD AND DEVICE FOR INJECTING TWO-PHASE $CO_2$ IN A TRANSFER GASEOUS MEDIUM

(75) Inventors: Dominique Bras, Tremblay en France (FR); José Buil, Fresnes (FR)

(73) Assignee: L'Air Liquide Societe Anonyme a Directoire et Conseil de Surveillance pour l'Etude et l'Exploitation des Procedes George Claude, Paris (FR)

( * ) Notice: Subject to any disclaimer, the term of this patent is extended or adjusted under 35 U.S.C. 154(b) by 506 days.

(21) Appl. No.: 10/521,011

(22) PCT Filed: Jul. 7, 2003

(86) PCT No.: PCT/FR03/02097

§ 371 (c)(1), (2), (4) Date: Jul. 11, 2005

(87) PCT Pub. No.: WO2004/007061

PCT Pub. Date: Jan. 22, 2004

(65) Prior Publication Data

US 2005/0268786 A1 Dec. 8, 2005

(30) Foreign Application Priority Data

Jul. 11, 2002 (FR) .................................. 02 08734

(51) Int. Cl.
*B01D 47/00* (2006.01)

(52) U.S. Cl. ............................ 96/243; 95/247; 95/266; 96/193; 96/194; 96/200; 55/319; 137/3; 137/896; 62/50.2; 62/52.1

(58) Field of Classification Search .................. 95/247, 95/266; 96/193-194, 200, 243; 55/319; 62/50.2, 52.1; 137/3, 896
See application file for complete search history.

(56) References Cited

U.S. PATENT DOCUMENTS

| | | | | | |
|---|---|---|---|---|---|
| 4,389,820 | A | * | 6/1983 | Fong et al. | 451/75 |
| 4,747,421 | A | * | 5/1988 | Hayashi | 134/201 |
| 4,806,171 | A | * | 2/1989 | Whitlock et al. | 134/7 |
| 5,172,555 | A | * | 12/1992 | Schmidtke | 62/50.2 |
| 5,378,312 | A | * | 1/1995 | Gifford et al. | 438/695 |
| 5,486,132 | A | * | 1/1996 | Cavaliere et al. | 451/75 |
| 6,533,252 | B1 | * | 3/2003 | Bernard et al. | 261/18.1 |
| 6,978,625 | B1 | * | 12/2005 | Kim | 62/52.1 |

FOREIGN PATENT DOCUMENTS

| | | | | |
|---|---|---|---|---|
| EP | 0 288 263 | | | 10/1988 |
| EP | 0288263 | A2 | * | 10/1988 |
| EP | 0 631 846 | | | 1/1995 |
| FR | 2 198 778 | | | 4/1974 |
| GB | 1 402 355 | | | 1/1973 |
| GB | 1402355 | | * | 8/1975 |
| WO | WO 02 24316 | | | 3/2002 |

OTHER PUBLICATIONS

International Search Report for PCT/FR2003/002097.

* cited by examiner

*Primary Examiner*—Duane Smith
*Assistant Examiner*—Ives Wu
(74) *Attorney, Agent, or Firm*—Christopher J. Cronin

(57) ABSTRACT

A method and an apparatus for injecting two-phase (gas+solid) carbon dioxide into a gas stream. Liquid carbon dioxide is cryogenically expanded into two-phase carbon dioxide, which is then injected into the center of the stream. An inerting gas is also injected into the stream along with the two-phase carbon dioxide.

6 Claims, 2 Drawing Sheets

METHOD AND DEVICE FOR INJECTING TWO-PHASE $CO_2$ IN A TRANSFER GASEOUS MEDIUM

BACKGROUND

The invention relates to a method and device for injecting two-phase "gas+solid" $CO_2$ into a transferring gaseous medium.

$CO_2$ is used in many industrial applications: carbonization, pH regulation and neutralization of basic agents are, among others, examples of this. Carbon dioxide may be injected into a liquid medium or a gaseous medium.

$CO_2$ is injected into a liquid medium in gaseous or liquid form as the case may be.

When carbon dioxide is injected into a gaseous medium, the usual solution is to inject it in a gaseous single phase form. Most often delivered in liquefied form and stored in this form in a tank, at a pressure of the order of 14 to 20 bar and a temperature of the order of −35 to −20° C., it is then necessary to vaporize it. This vaporization requires the on-site presence of a vaporizer which involves a high cost, both operationally as well as in investment, whether the energy is of electrical origin or is provided by steam available on-site. Moreover, the gaseous carbon dioxide feed line as well as the associated accessories (gate valves, valves etc.) are bulky and costly. Thus conventional devices for injecting carbon dioxide into a gaseous medium are not optimized and these devices are in particular not suitable in the case of the injection of large quantities of $CO_2$.

The use of $CO_2$ in solid form or as carbon dioxide snow is moreover known for cleaning surfaces.

U.S. Pat. No. 4,747,421 describes the use of solid $CO_2$ in the industrial field of semiconductors for removing a photoresist film on the surface of a substrate.

EP 0 631 846 describes an apparatus designed to produce an aerosol for cleaning the inner surfaces of a tool room.

EP 0 288 263 describes an apparatus for removing small particles on the surface of a substrate using a mixture of solid and gaseous carbon dioxide.

U.S. Pat. No. 4,389,820 describes a machine designed to generate a stream of accelerated sublimable particles for surface descaling. The use of $CO_2$ prevents contamination of surfaces as well as atmospheric pollution.

In addition, FR 2 198 778 describes a method and an apparatus for preparing foundry molds, a method in which gaseous carbon dioxide is used for delivering gaseous components in catalytic quantities, both when the mixture of liquid chemical components is gasified as well as when the quantities of components to be added are adjusted.

However, none of the documents cited relates to the enrichment of a transferring gaseous medium with $CO_2$.

SUMMARY

An object of the present invention is to provide a solution to the problem of injecting carbon dioxide, particularly in a large quantity, into chambers containing a reactive or unreactive pressurized transferring gaseous medium.

Another object is to provide an injection device capable of implementing this method.

The features and advantages of the invention will become apparent on reading the following description.

The invention relates first of all to a method for injecting carbon dioxide into a pressurized transferring gaseous medium to be treated, present inside a chamber, from liquid carbon dioxide, the method comprising the following steps:

converting liquid carbon dioxide into two-phase "gas+solid" carbon dioxide by means of a direct expansion device;

injecting the two-phase carbon dioxide so formed into the gaseous medium to be treated with the aid of an injector tapped into the wall of the chamber containing said pressurized transferring gaseous medium to be treated; and a step of injecting an inerting gas into the carbon dioxide between the direct expansion device and the injector.

DESCRIPTION OF PREFERRED EMBODIMENTS

The present invention provides a solution to the problem of injecting carbon dioxide, particularly in a large quantity, into chambers containing a reactive or unreactive pressurized transferring gaseous medium.

The invention also provides an injection device capable of implementing this method.

Carbon dioxide is injected into the pressurized transferring gaseous medium to be treated, present inside a chamber, from liquid carbon dioxide. The method comprises the following steps:

converting liquid carbon dioxide into two-phase "gas+solid" carbon dioxide by means of a direct expansion device;

injecting the two-phase carbon dioxide so formed into the gaseous medium to be treated with the aid of an injector tapped into the wall of the chamber containing said pressurized transferring gaseous medium to be treated; and a step of injecting an inerting gas into the carbon dioxide between the direct expansion device and the injector.

Carbon dioxide is injected in the "gas+solid" form, and injection is carried out directly into the gaseous medium to be treated through a wall of the chamber that encloses the medium to be treated. The chamber may be for example a line or pipeline present in a circuit. Conversion of liquid carbon dioxide into two-phase carbon dioxide makes use of a direct expansion device called a cryogenic expansion device. The device, of the variable-flow valve type, first of all causes the fluid flow to be restricted and then an increase in the flow diameter has the effect of expanding the gas, bringing about a pressure loss so that the pressure at the outlet from the device corresponds to that of the triple point of $CO_2$. Liquid $CO_2$ is converted into a mixture of gaseous $CO_2$ and solid $CO_2$ (carbon dioxide snow). Thus, during injection, the method of the invention employs a cryogenic fluid with a density at least twenty times greater than its gas phase. Injection of carbon dioxide is carried out using an injector that is tapped into the wall of the chamber and transfers the "gas+solid" mixture to the centre of the pipeline transferring the gaseous medium. Moreover, injection of an inerting gas into the carbon dioxide, at the outlet from the cryogenic valve, prevents blockages in the gaseous medium at the outlet from said valve and at the outlet from the injector. The inerting gas, by ensuring that gas is swept through in the region of the various elements of the device where two-phase $CO_2$ circulates, prevents contamination by foreign bodies, in particular moisture, and prevents the accumulation of carbon dioxide snow at points where the geometry would make its circulation difficult without entrainment by the inerting gas.

Liquid $CO_2$ is provided at a pressure generally between $10\times10^5$ and $22\times10^5$ Pa (that is between 10 and 22 bar) and at a temperature generally between −35° C. and −20° C.

According to a particular embodiment, the two-phase carbon dioxide is injected so that it is injected into the core of the gaseous medium and distributed partly cocurrently and partly countercurrently to the gas stream. By injecting carbon dioxide in this way into the core of the gas, that is to say into the gas current away from the walls, better mixing and entrainment of $CO_2$ is ensured, in this way preventing it accumulating. Now, the risk of formation of blockages is very great taking into account the temperature of the $CO_2$ (−80° C.). It is therefore essential to disperse this immediately into the gaseous medium to be treated. Apart from the geometry of the injector, the presence of the inerting gas, injected into two-phase $CO_2$ according to the invention, also makes it possible to limit the risk of blockages.

This inerting gas must be inert to chemical species present as well as to regulating devices (flow-regulating valves, the injector specific to the invention, etc.) It is particularly advantageous to use, as the inerting gas, carbon dioxide coming from the vaporization of a fraction of the available liquid carbon dioxide, and drawn off upstream of the cryogenic expansion device. It will be noted that since $CO_2$ does not introduce a new chemical species, it can by extension be also considered as an inert gas.

The quantity of carbon dioxide injected is preferably regulated in relation to a set value of a physical or chemical parameter to be attained, measurement of this parameter being carried out in the gaseous medium, downstream from the injection point. Thus, the variable-flow cryogenic valve of the invention is controlled in relation to this set value.

In addition, a safety cryogenic valve of the on/off type can also be placed upstream of the variable-flow cryogenic valve in order to cut off the feed of liquid $CO_2$ in the case of malfunction, for example if the pressure is too high in the gaseous medium to be treated, if the temperature is too low there or if another parameter, considered as a major parameter, has exceeded an alarm threshold. The operator of the installation can also control this valve. When the feed to the variable-flow cryogenic valve is cut off, sensitive elements of the device are protected by maintaining a slight flow of inerting gas.

According to another feature, the invention relates to a method for enriching a gas stream with carbon dioxide from liquid carbon dioxide.

According to a particular embodiment, it comprises the following steps:

- converting liquid carbon dioxide into two-phase "gas+solid" carbon dioxide by means of a direct expansion device;
- injecting the two-phase carbon dioxide so formed into the gas stream to be enriched with the aid of an injector tapped into the wall of the chamber containing said gas stream to be enriched;

and in that it includes a step of injecting an inerting gas into the carbon dioxide between the direct expansion device and the injector.

The invention also relates to a carbon dioxide injection device for implementing one of the previously defined methods, characterized in that it comprises:

- a variable-flow expansion valve (designed to be fed with liquid carbon dioxide) and a corresponding injector tapped into a wall of the chamber and penetrating into the core of the gaseous medium;
- a T-piece connected in the upper part to the ejector of the expansion valve (the expansion valve is understood to be the variable-flow valve), connected on the side to a gas feed and connected in the lower part to the injector tapped into said wall;
- means for feeding the expansion valve with liquid $CO_2$; and
- means for feeding the T-piece with inerting gas.

The end of the injector judiciously consists of:

- a deflector with two slopes distributing the two-phase $CO_2$ partly countercurrently and partly cocurrently to the gas stream;
- two exhaust openings for ejecting the two-phase $CO_2$, arranged so as to distribute it in the axis of transfer of the gas stream.

Preferably, the injector enters the chamber over a length equivalent to half the width of said chamber and, according to a preferred variant, the device includes, for feeding the injection device with inerting gas, upstream of the cryogenic expansion device, means for drawing off and vaporizing a fraction of the available liquid carbon dioxide. The device can therefore operate while being connected to a single carbon dioxide feed source. It will also be possible to use an inert gas present on the application site or compressed air, it being understood that the inerting gas should not modify the behavior of the mixture obtained, and should not be counter-indicated for the equipment.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

Figure 1:
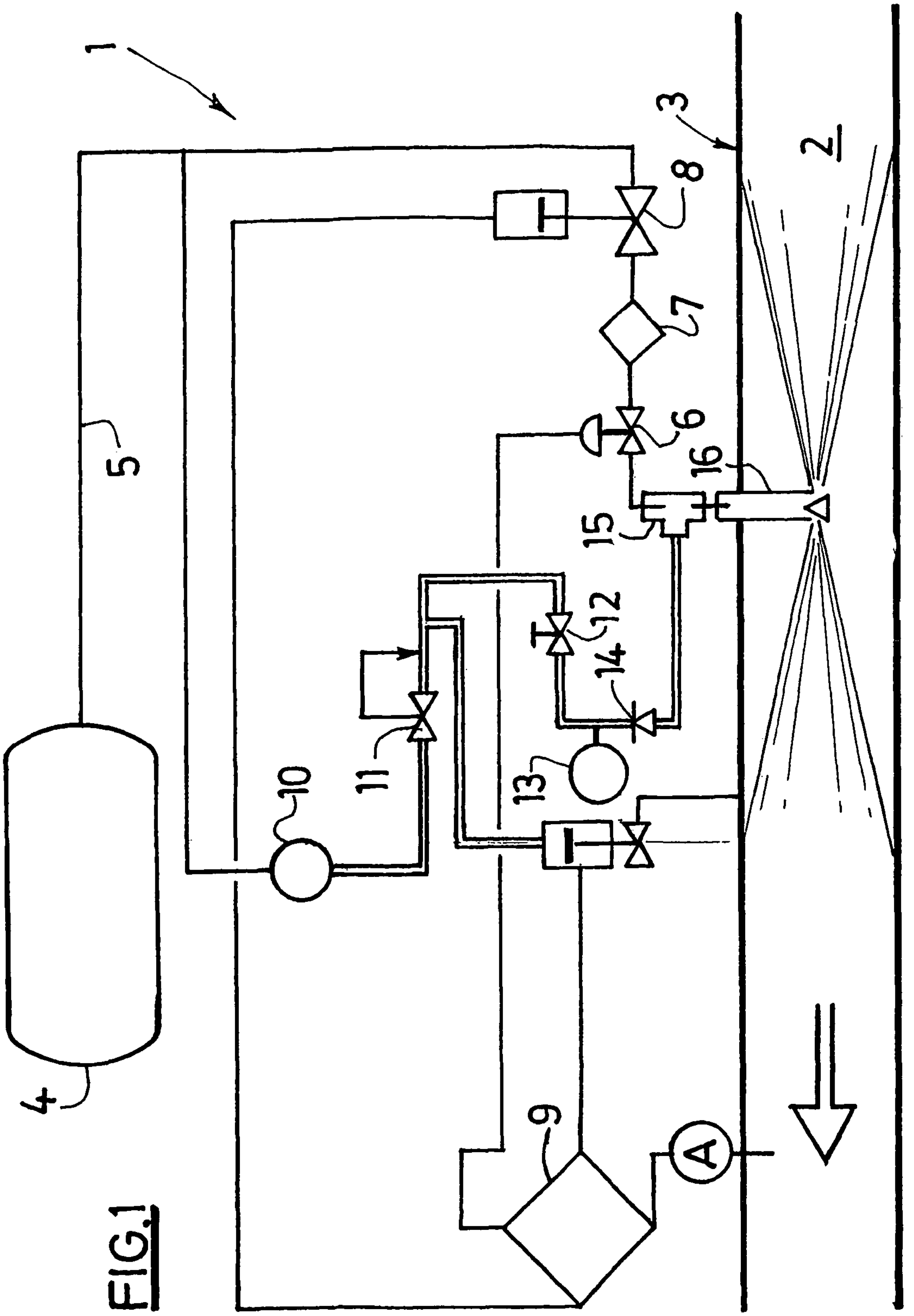
FIG. 1 illustrates a schematic view of one embodiment of the present invention.

The injection device 1 is designed to provide "gas+liquid" two-phase carbon dioxide into a gaseous medium 2, in transfer under pressure into a chamber 3, and this from a liquid carbon dioxide storage tank 4 in which liquid carbon dioxide is stored at a pressure of between $14\times10^6$ and $20\times10^6$ Pa (that is between 14 and 20 bar) and at a temperature of between −35° C. and −20° C.

The device 1 comprises a liquid $CO_2$ feed line formed of a liquid line 5 extending from the tank 4 to a variable-flow cryogenic valve 6 which provides regulation of a parameter "A" measured in the gaseous medium 2 downstream from the injection point. A filter 7 fitted with a filter cartridge made of stainless steel is placed upstream of the valve 6 and provides filtration of liquid carbon dioxide so as to protect the valve seat from solid impurities that can be present in the pipelines. Interposed on line 5, upstream of the filter 7, there is located a cryogenic safety valve of the on/off type which cuts off the cryogenic $CO_2$ feed of the valve 6 when the control device 9 detects that the threshold is exceeded for a safety parameter under control. An expansion cryogenic valve, not shown in the figure, protects the line downstream from the safety valve 8 after the latter has been closed.

The device 1 additionally includes a line for feeding inerting gas, which in this case is gaseous $CO_2$. The line consists, in order, of a vaporizer 10, an expansion device 11, a valve with a manually regulated flow 12, a flow meter with transmitter 13 and a non-return valve 14.

A T-piece 15, supplied at the upper part with two-phase $CO_2$ coming from the ejector situated at the outlet from the valve 6, and on the side with inerting gas (gaseous $CO_2$), is connected at the lower part to an injector 16 ensuring injection of the two-phase $CO_2$ mixture into the pressurized transferring gaseous medium 2 in the chamber 3.

The injector 16 transfers $CO_2$ to the centre of the pipeline transferring the gaseous medium. When there is no injection of $CO_2$, the interior of the T-piece 15 and the injector 16 are protected from the medium to be treated by means of a small but continuous flow of inerting gas.

A unit for controlling-regulating the parameter "A" measures the value of the parameter "A" in the transfer pipeline, processes (via the control device 9) the signal received from "A" as well as the signals coming from different safety parameters followed (temperature and pressure of the gaseous medium to be treated, etc.). It controls, as a function of "A", the amount that the variable-flow cryogenic valve 6 is opened so as to maintain the parameter "A" at its set value. It also controls the closing of the safety cryogenic valve 8 in the case of a major failure affecting a safety parameter, or in the case of a refusal of authorization for treatment on the part of the operator as well as the opening or closing of the vent valve according to the operational mode, generally synchronous with other valves. This control of the control unit is carried out from information communicated by AIT measuring transmitters (measurement of the "A" parameter), PIT measuring transmitters (measurement of the pressure in the gaseous medium 2) and TT measuring transmitters (measurement of the temperature of the medium 2) not referenced. Other elements that are not described can be incorporated in this control unit, in particular binary information of the authorization type or other parameters specific to the method.

Figures 2, 2A:
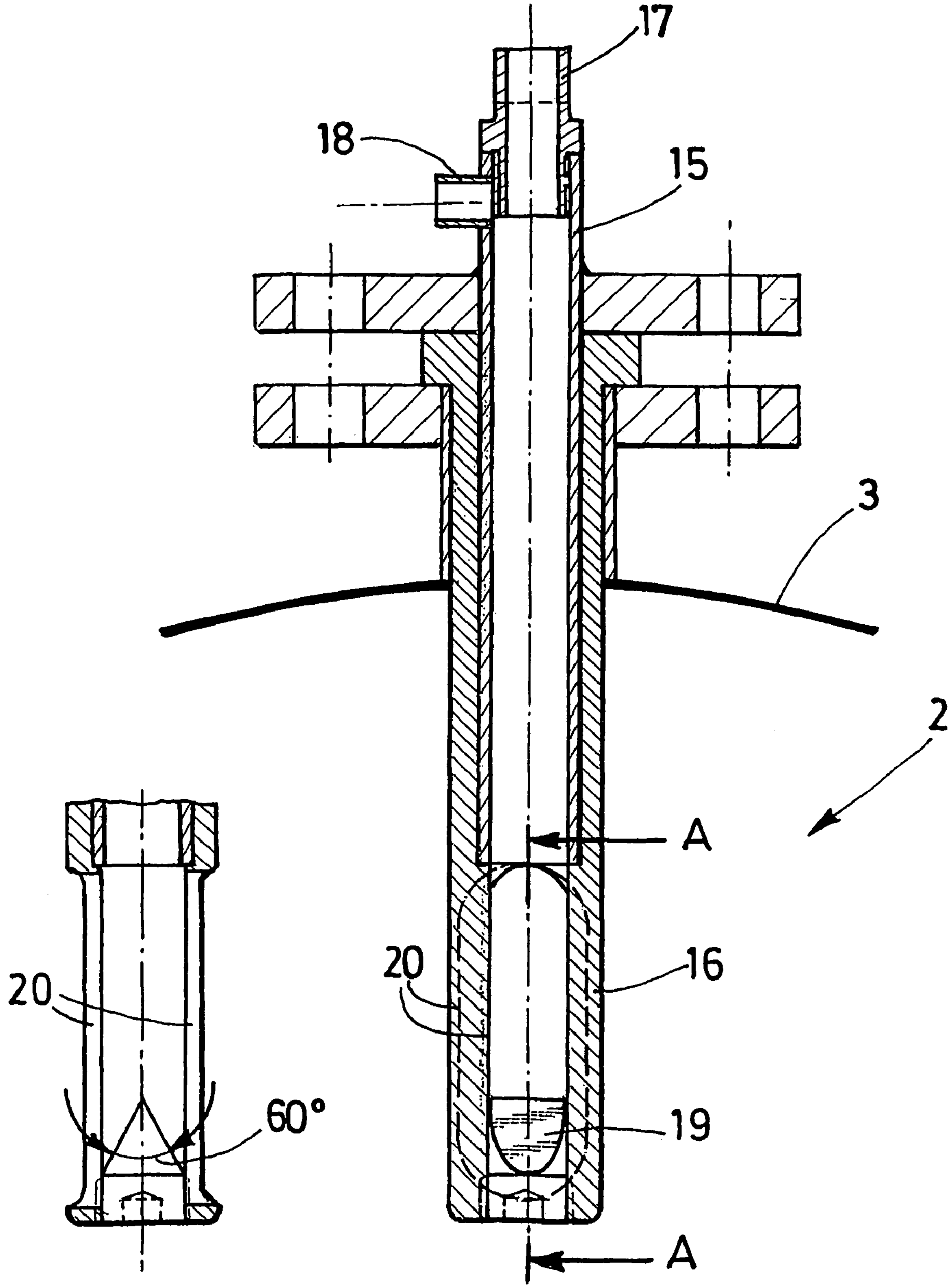
FIG. 2 illustrates a view of one embodiment of an injector according to the present invention.
FIG. 2A illustrates a sectional view, along the axis AA, of the embodiment shown in FIG. 2.

FIG. 2 represents, in a more detailed manner, an example of an injector according to the invention.

The injector 16 is fed with two-phase $CO_2$ coming from the ejector 17 at the outlet from the valve 6 and with inerting gas consisting of gaseous $CO_2$. This feed is carried out via the T-piece 15 that receives the inerting $CO_2$ at the level of the side inlet 18 and two-phase $CO_2$ coming from 17 at the upper part. The injector 16, made of a thermally-insulating material, for example polysulfone, leads the "gas+solid" mixture to the centre of the pipeline 3 transferring the gaseous medium 2.

The injector 16 is provided:

at its end with a deflector 19 with two slopes forming an angle of 80° so as to direct part of the two-phase $CO_2$ countercurrently to the circulating gaseous medium 2, and the other part cocurrently;

at its lower part two exhaust openings 20 which are for ejecting two-phase $CO_2$, even at a low flow rate, and for distributing it in the transfer axis of the gaseous medium, without obstructing the outlet thereof by virtue of their arrangement in the transfer axis.

EXAMPLE

The method of the invention is implemented for enriching vapors from the combustion of natural gas in $CO_2$. The parameter "A" to be regulated is the $CO_2$ content of these vapors. Initially at approximately 8% $CO_2$, the vapors are enriched by the method of the invention to contents of between 12 and 18%, for their subsequent use in a method for producing paper. The vapor flow rate is of the order of 12 000 $m^3$/h. The quantity of $CO_2$ used is approximately 1200 $m^3$/h $CO_2$ (gas equivalent) to reach 16% $CO_2$ in the vapors. The vapors enriched in this way are in particular intended for the production of calcium carbonate.

The presence of water vapor in these vapors creates, by reason of the interface between the hot vapors and the cryogenic source, problems associated with the risk of ice formation, particularly in the region of the injector openings. This risk is eliminated by means of permanent inerting of the injector with an inert dry gas.

The method of the invention is in particular applicable in many fields making use of $CO_2$ as a raw material. Since the enrichment employed according to the invention does not make use of gaseous $CO_2$, it is free from dimensioning constraints and the disadvantages associated therewith.

The invention is therefore particularly suited to industrial installations having vapors containing $CO_2$, in itself a polluting agent, and moreover using $CO_2$ as a raw material.

The method of the invention can also be used in cases where it is desired to treat a transferring gaseous medium with $CO_2$.

It is also capable of regulating pH using vapors doped with $CO_2$.

The method of the invention can therefore be applied advantageously to the enrichment of vapors with $CO_2$ for producing calcium carbonate for industrial papermaking.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for injecting carbon dioxide into a pressurized gaseous stream, said method comprising:

a) converting liquid carbon dioxide into two-phase "gas+solid" carbon dioxide, wherein said liquid carbon dioxide is converted with a direct expansion device;

b) injecting a second gas into said two-phase carbon dioxide; and c) injecting the mixture of said two-phase carbon dioxide and said second gas into a pressurized gas stream with an injector, wherein said injector is connected to the chamber containing said stream.

2. The method of claim 1, further comprising injecting said two-phase carbon dioxide into about the center of said stream, wherein:

a) at least part of said two-phase carbon dioxide is distributed substantially in the direction of stream flow; and b) at least part of said two-phase carbon dioxide is distributed in a direction substantially against said flow.

3. The method of claim 1, wherein said second gas comprises gaseous carbon dioxide withdrawn from upstream of said expansion device.

4. A method for injecting carbon dioxide into a pressurized gaseous stream, said method comprising:

a) converting liquid carbon dioxide into two-phase "gas+solid" carbon dioxide, wherein said liquid carbon dioxide is converted with a direct expansion device;

b) injecting a second gas into said two-phase carbon dioxide;

c) injecting the mixture of said two-phase carbon dioxide and said second gas into a pressurized gas stream with an injector, wherein said injector is connected to the chamber containing said stream; and d) adjusting the amount of said mixture injected into said stream based upon a measured parameter of said stream, wherein:

said parameter is measured at a location substantially downstream of said injector; and said parameter comprises at least one member selected from the group consisting of:

1)a physical characteristic of said stream; and 2)a chemical characteristic of said stream.

5. An apparatus for enriching a gas stream with carbon dioxide, said apparatus comprising:

a) a variable flow expansion valve;

b) an injector connected to a chamber, wherein said chamber contains a gas stream;

c) a T-piece having an user end, a lower end, and a side, wherein said upper end of said T-piece is connected to an outlet of said valve, and said lower end of said T-piece is connected to said injector;

d) a device adapted to supply said valve with liquid carbon dioxide; and e) a device for feeding said T-piece with an inerting gas, said device for feeding said T-piece is connected to said side of said T-piece, wherein said injector further comprises:

1) a deflector located at an end of said injector, wherein said deflector comprises two slopes for distributing two-phase carbon dioxide into said gas stream, wherein:

at least part of said carbon dioxide is distributed substantially in the direction of stream flow; and at least part of said carbon dioxide is distributed in a direction substantially against said flow; and 2) at least two openings for said carbon dioxide, wherein said openings are positioned to distribute said carbon dioxide along the axis of transfer of said stream.

6. The apparatus of claim 5, wherein said slopes form an angle of about 80° with respect to each other.

* * * * *

UNITED STATES PATENT AND TRADEMARK OFFICE

CERTIFICATE OF CORRECTION

PATENT NO. : 7,648,569 B2
APPLICATION NO. : 10/521011
DATED : January 19, 2010
INVENTOR(S) : D. Bras et al.

It is certified that error appears in the above-identified patent and that said Letters Patent is hereby corrected as shown below:

In Column 7, line 12, claim 5 replace the “user” with the word --upper--.

Signed and Sealed this

Third Day of August, 2010

David J. Kappos

*Director of the United States Patent and Trademark Office*